United States Patent [19]

Müller et al.

[11] Patent Number: 4,851,911
[45] Date of Patent: Jul. 25, 1989

[54] VIDEO SIGNAL NOISE REDUCTION CIRCUIT

[75] Inventors: Klaus D. Müller, Weiterstadt; Ernst Rau, Nauheim; Hans-Wilhelm Zappen, Bensheim, all of Fed. Rep. of Germany

[73] Assignee: Robert Bosch GmbH, Stuttgart, Fed. Rep. of Germany

[21] Appl. No.: 81,323

[22] Filed: Aug. 3, 1987

[30] Foreign Application Priority Data

Aug. 29, 1986 [DE] Fed. Rep. of Germany ....... 3629536

[51] Int. Cl.⁴ .............................................. H04N 5/21
[52] U.S. Cl. ................................................. 358/167
[58] Field of Search ................ 358/167, 36, 336, 340, 358/905

[56] References Cited

U.S. PATENT DOCUMENTS

| | | | |
|---|---|---|---|
| 3,700,803 | 10/1972 | Rhee | 358/167 |
| 4,412,253 | 10/1983 | Oguino | 358/167 |
| 4,509,078 | 4/1985 | Kuroda | 358/167 |
| 4,723,166 | 2/1988 | Stratton | 358/167 |

Primary Examiner—Tommy P. Chin
Attorney, Agent, or Firm—Frishauf, Holtz, Goodman & Woodward

[57] ABSTRACT

High-frequency portions of the video signals are substantially damped at low signal levels by including, selectively, a low-pass filter (12) in circuit with a signal path, selectively, in accordance with the setting of a transfer switch (13), the setting of which is controlled as a function of the signal level with respect to a threshold ($U_{St}$), which may vary, for example in accordance with amplification of a signal being received from a television camera tube system (1,2,3).

13 Claims, 1 Drawing Sheet

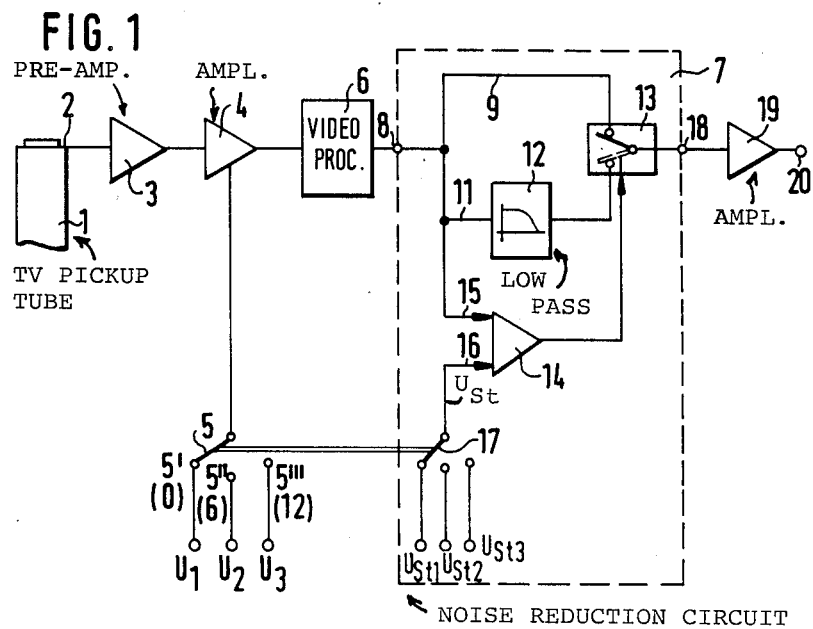
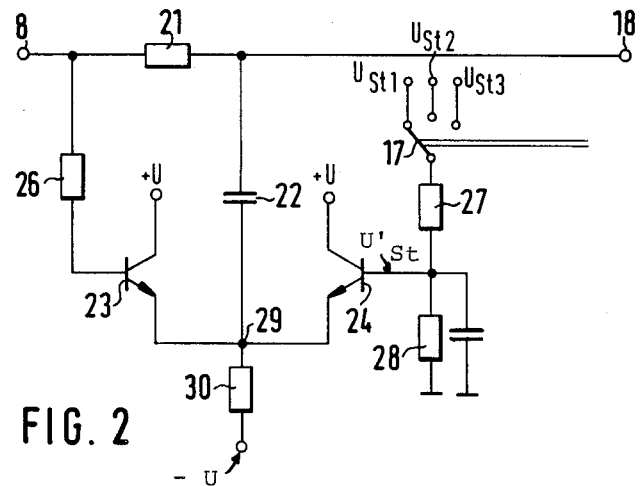

VIDEO SIGNAL NOISE REDUCTION CIRCUIT

The present invention relates to television signal processing and more particularly to a video signal noise reduction circuit in which high-frequency portions of the video signal are damped when the signal level is low.

BACKGROUND

It is known that noise components are present in the video signal primarily in the region of the higher frequency portions thereof. It is thus possible to reduce noise by damping the high frequencies. Doing so, however, also results in a decrease of resolution, thus markedly decreasing the quality of the reproduced image. It has been proposed to transmit high frequencies essentially undamped when the video signal level is high, and to damp the signals only when the video signal is low. It is less detrimental to decrease the resolution in the dark image portions than to accept a superimposed and visible noise on the signal.

It is particularly important to reduce the signal-to-noise level when recording video signals since only a relatively low level video signal is available, derived from the video imaging tube.

The referenced U.S. Pat. No. 4,412,253 describes a circuit to decrease the noise level in a video receiver, in which a high-frequency noise component of a video image is sensed during a portion of the line retrace. A threshold value is established for suppression of high-frequency components in a noise reduction circuit. The threshold level is so controlled in dependence of the amplitude of the received signal, that high-frequency components which are less than the predetermined amplitude will not appear in the reproduced field; high-frequency components, however, which have an amplitude in excess of the threshold values are amplified. This known noise suppression circuit is comparatively complex and, under some conditions, causes deterioration of the frequency distribution of the video signal since several non-linear impedance elements must be used therein.

THE INVENTION

It is an object to provide a circuit to decrease noise as a function of signal level which is particularly suitable for use in video cameras, and in which an increased signal-to-noise level is obtainable by controlling the frequency relationship, in other words, the transmitted or propagated frequency spectrum, as a function of signal level.

Briefly, the video signal path includes a low-pass filter which is connected in circuit when the signal levels of the video signal are low. In accordance with a feature of the invention, the level is set by one or more predetermined values, for example voltage values and, in one example, a threshold level of at the most 10% of the video signal amplitude.

The circuit and system have the advantage that the relatively simple component of a filter can be used to obtain marked improvement of the signal-to-noise ratio, particularly at low signal levels.

DRAWINGS

FIG. 1 is a general block diagram of a television camera, including the basic feature of the present invention; and FIG. 2 is a detailed circuit diagram of the noise reduction circuit.

DETAILED DESCRIPTION

FIG. 1 illustrates, schematically, a television pickup tube 1 which has a signal electrode 2 from which a video signal is derived. The video signal is amplified in a preamplifier 3 and applied to a first amplifier stage 4. Amplifier stage 4 is a controlled amplifier which has applied thereto selected d.c. voltages $U_1$, $U_2$, $U_3$ of a level which is determined by the switching position of switch 5. Switch 5, also known as a dB switch provides d.c. voltage to the amplifier 4 in accordance with the dB numbers, as shown 0 for switch position 5', 6 for switch position 5'' and 12 for switch position 5'''. After amplification in the amplifier 4, the video signal is applied to a video processor 6 for standard processing of the signal, for example clamping, "white" level correction and the like, as well known in the video signal processing field.

In accordance with the invention, a noise reduction circuit 7 is coupled to the output of the video processor 6 The noise reduction circuit 7, shown by the block outlined in broken lines, has its input terminal 8 connected to receive the video signal from the video processor 6. The signal is transmitted over two parallel paths 9 and 11. Path 9 connects directly from input terminal 8 to one terminal of a transfer switch 13, and through the transfer switch 13 to output terminal 18 and then to a second amplifier 19 for connection to a final output terminal 20. The second path, in accordance with a feature of the invention, is through a low-pass filter 12 to the other transfer terminal of switch 13. Additionally, the input terminal 8 is connected to an input terminal 15 of a comparator 14. Comparator 14 provides an output signal to control the position of the transfer switch 13. The second input 16 of the comparator 14 receives an input voltage $U_{St}$. The level of this input voltage can be selected between respective levels $U_{St1}$, $U_{St2}$ and $U_{St3}$, by suitable positioning of switch 17. Switch 17 is coupled to switch 5, so that, in dependence on the amplification degree of the first amplifier 4, the threshold level $U_{St}$ of comparator 14 is changed. The change of the threshold level of the comparator is so arranged that with a high amplification, that is, a higher dB number, the threshold level applied to terminal 16 is also increased.

BASIC OPERATION

The comparator 13 provides a switching signal to transfer switch 13 when one input voltage increases with respect to the other. Let it be assumed that the video signal at the input 15 is higher than the threshold level at input 16. In this condition, transfer switch 13 will be in the full line position as shown, and the video signal applied from input terminal 8 is directly connected to output terminal 18, without any change. When, however, the video signal drops below the threshold level, transfer switch 13 will change over into the broken line position, and the video signal is conducted through the low-pass filter 12. The low-pass filter 12 has a limiting frequency of between about 1.5 to 2 MHz. Due to this frequency pass range, only low-frequency components of the frequency spectrum, up to about 1.5 MHz, pass essentially without damping or attenuation. High-frequency components of the video signals are, however, completely blocked. Thus, noise in the dark portions of the picture is effectively suppressed. This, now noise-free video signal, is applied via the output terminal 18 to the second amplifier stage 19 for further processing and amplification, obtainable from terminal 20.

The detailed circuit 7 is shown in FIG. 2: the video signal input 8 is connected to a low-pass filter formed by an RC element having a series resistor 21 and a cross-connected capacitor 22. The comparator stage is formed of two transistors 23,24, both connected in emitter follower circuit, in which the transistor 23 receives the input signal via resistor 26, and the transistor 24 receives a control signal which depends on the setting of switch 17, as modified by the voltage division ratio of the voltage divider formed by resistors 27,28. The junction 29, connected to the emitters of the transistors 23,24, is connected to the negative supply voltage terminal $-U$, and, likewise, is connected to the second electrode of the capacitor 22. The collectors of the transistors 23,24 are connected to positive supply voltage $+U$.

OPERATION, CIRCUIT OF FIG. 2

The high-frequency portions of the video signal are attenuated in accordance with the frequency filtering characteristics of the filter formed by resistor/capacitor combination 21,22, up to the level of the threshold voltage $U_{St}$. When the video signal level exceeds the threshold voltage, transistor 23 becomes conductive, so that the capacitor 22 will have the same voltage at both terminals, the capacitor then becoming essentially ineffective. The video signal is then transmitted to output terminal 18 without any change in its frequency distribution.

The comparator circuit formed by the transistors 23,24 is so arranged that the threshold voltage $U'_{St}$ applied to the base of the transistor 24 is, preferably, at the most 10% of the maximum video signal amplitude which can be applied to terminal 8. The actually applied comparison voltage is adjustable by applying respective voltage levels to the base of transistor 24 in accordance with the setting of switch 17.

FIG. 2 shows single transistors 23,24 for simplicity. The single transistors may be replaced, of course, by multiple transistor stages.

Various changes and modifications may be made within the scope of the inventive concept.

We claim:

1. Video signal noise reduction circuit (7) for a video signal connected in a signal path from an input terminal (8) to an output terminal (18) of the noise reduction circuit comprising means for selectively propagating predetermined spectral portions of the video signal in dependence on the level of the video signal by propagating, through said signal path, all frequency portions when the signal level is high and propagating, in damped manner, high frequency portions of said video signal in the signal path when the signal level is low, including level detection means (14, 15, 16) for detecting the level of the video signal connected to have the video signal applied thereto;

a low-pass filter (12); coupled in said signal path and said means for selectively propagating further comprises a switch means (13) connected to and controlled by said level detection means and selectively connecting said low-pass filter (12) in the signal path of said video signal when the level detection means detects that said video signal has a low level to attenuate or dampen the high frequency portions of said video signal by the connected low-pass filter when the low-pass filter is connected in the signal path when said video signal has a low level.

2. The circuit of claim 1, wherein said low level is below a predetermined video signal level.

3. The circuit of claim 1, wherein the means for detecting the level of the video signal comprises a comparator (14) having a first input (15) connected to receive the video signal and a second input (16) connected to receive a threshold level signal ($U'_{St}$);

and output means from said comparator connected to and controlling the switch means (13).

4. The circuit of claim 3, wherein said threshold level signal comprises a threshold voltage which is at the most about 10% of the voltage of the video signal applied to the first input (15) of the comparator (14).

5. The circuit of claim 2, wherein said predetermined video signal level is up to about 10% of the video signal level.

6. The circuit of claim 3, wherein said threshold level signal is adjustable.

7. The circuit of claim 1, in combination with a television camera tube means (1, 2) and a controlled amplifier (4) connected to receive an output signal from the television camera tube means and apply said output signal to said video signal noise reduction circuit (7), said amplifier (4) including an amplification level control switch (5) connected to control the amplification of said controlled amplifier (4);

and wherein the low level of the video signal which causes selective connection of the low-pass filter in the signal path of the video signal is changeable as a function of the amplification level of said controlled amplifier.

8. The circuit of claim 7, wherein the means for detecting the level of the video signal comprises a comparator (14) having a first input (15) connected to receive the video signal and a second input (16) connected to receive a threshold level signal ($U'_{St}$);

output means from said comparator connected to and controlling the switch means (13);

further including a level change switch (17) coupled to said amplification control switch (5) to control the level of said threshold level signal as a function of the level of amplification of the television camera tube output signal;

and wherein said amplification level control switch (5) and said level change switch (17) are coupled to connect said low-pass filter in the signal path at a higher video signal level when the amplification level, as controlled by the amplification level control switch (5) coupled to the controlled amplifier (4), controls the controlled amplifier to provide a higher degree of amplification.

9. The circuit of claim 1, wherein the low-pass filter comprises a RC circuit having a series resistor (21) and a cross-connected capacitor (22) having one terminal connected to a terminal of said resistor and a second terminal (29) connected to a reference voltage;

and means (23,24) for setting the reference voltage at the second terminal of the capacitor at low video signal levels as a function of the threshold voltage whereas, at high signal levels, the voltage at said second terminal is effectively removed, said means including said level detection means.

10. The circuit of claim 9, wherein said level detection means comprises a first transistor means (23) connected in emitter follower connection in parallel to the resistor-capacitor combination (21,22) forming said low-pass filter, and having an input electrode connected (26) to the video signal path, and an output electrode connected to said second terminal (29) of the capacitor;

and a second transistor means (24) connected in emitter-follower circuit, having an input electrode to which a controllable reference voltage $U'_{St}$ is applied, and an output electrode connected additionally to said second terminal (29) of the capacitor (22).

11. The circuit of claim 10, wherein said controllable reference voltage connected to the second transistor means is up to about 10% of the voltage level of a maximum video signal applied to the control electrode of the first transistor means (23).

12. The circuit of claim 11, in combination with a video camera means (1, 2, 3) including a controlled amplifier (4) having a controlled amplification level and supplying said video signal from the video camera means after variable controlled amplification;

and wherein the reference voltage applied to the second transistor means is variable in accordance with variation of the controlled amplification level of the controlled amplifier.

13. The circuit of claim 12, further including an amplification level control switch (5) connected to the controlled amplifier;

and a reference level control switch (17) connected to the input electrode of the second transistor means (24), said amplification level control switch (5) and said reference level control switch (17) being coupled together for conjoint control of respectively different amplification levels to the amplifier (4) and of the second transistor means. (24).

* * * * *